UNITED STATES PATENT OFFICE.

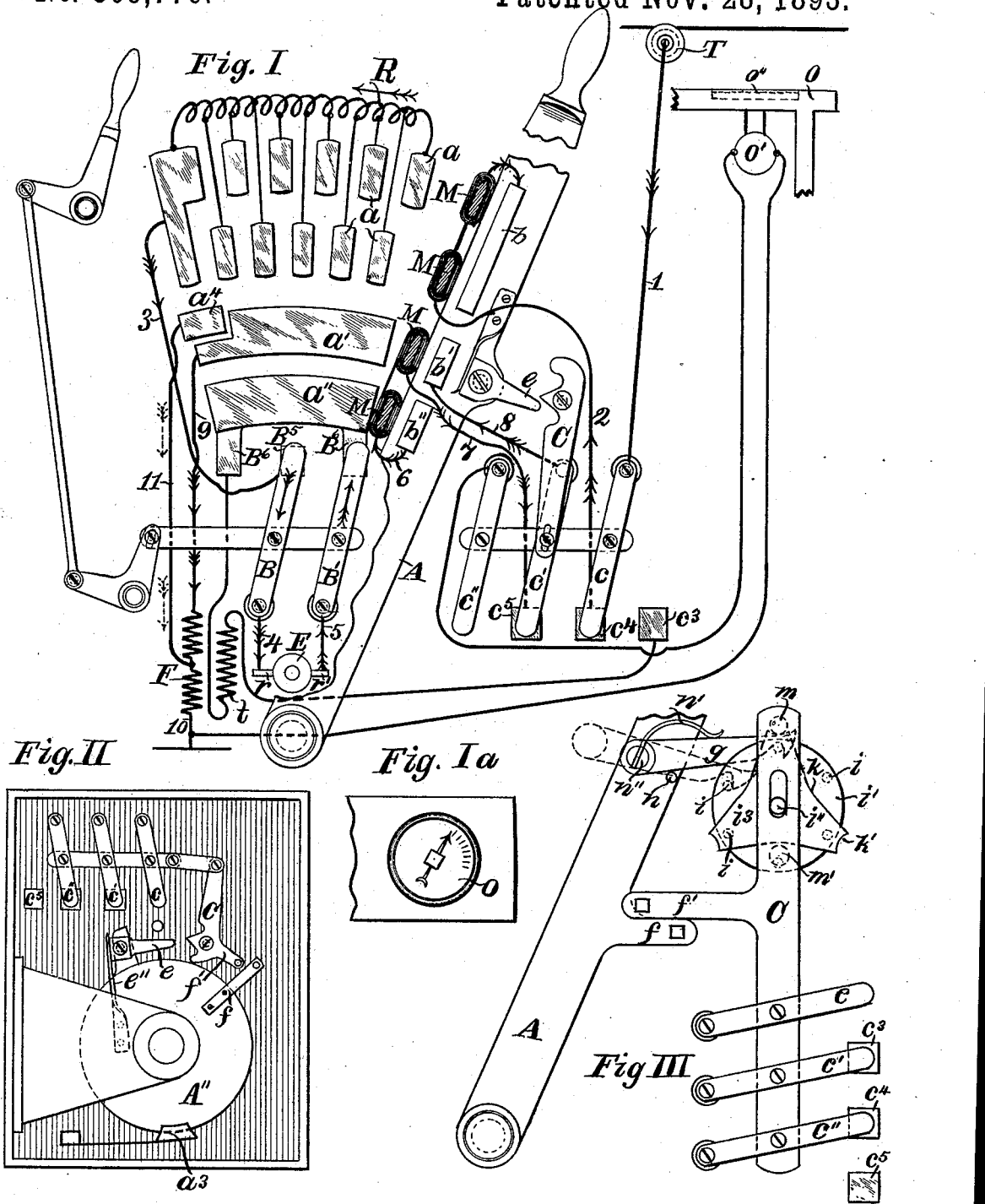

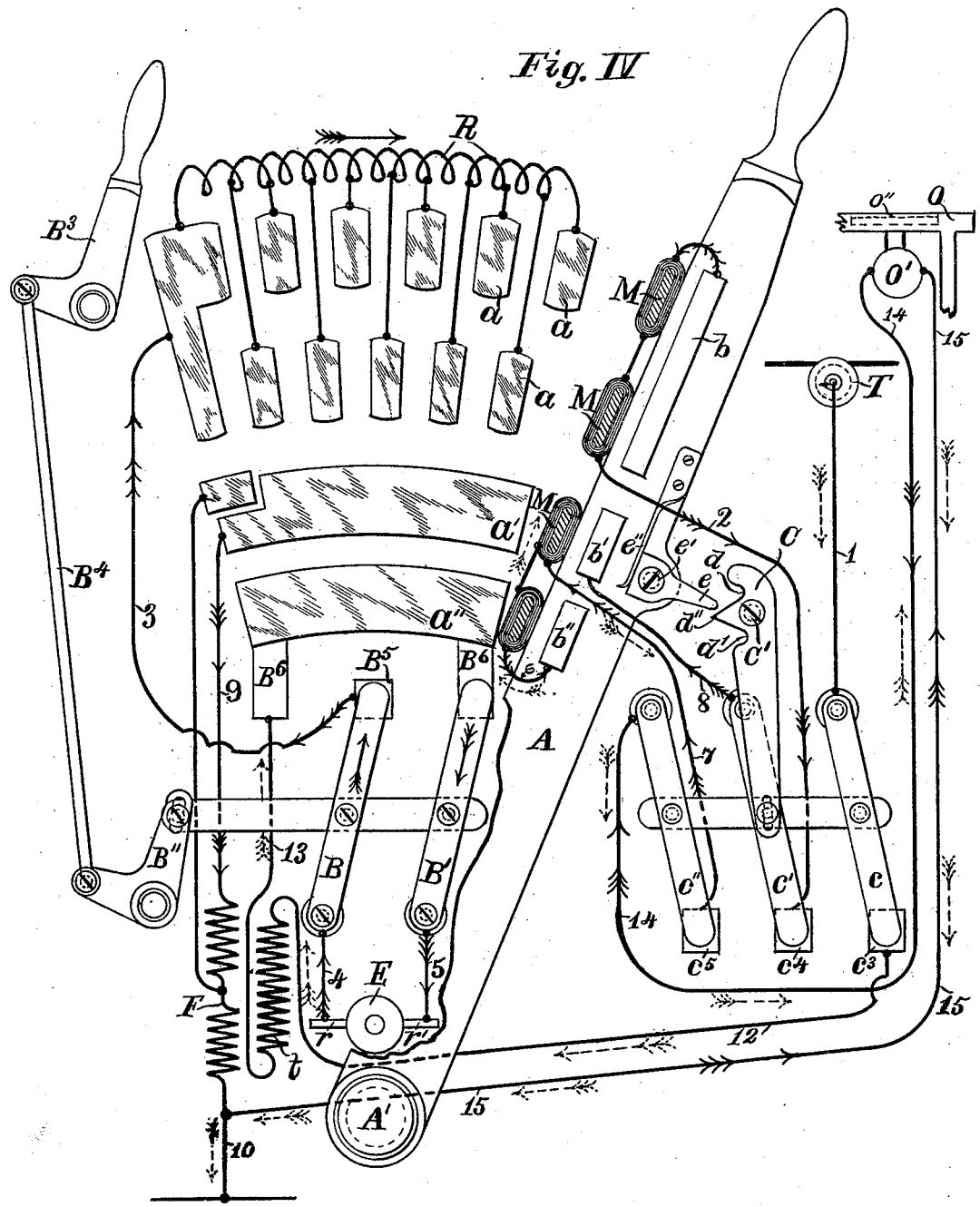

ELMER A. SPERRY, OF CLEVELAND, OHIO.

ELECTRICAL CONTROLLER.

SPECIFICATION forming part of Letters Patent No. 509,776, dated November 28, 1893.

Application filed August 21, 1893. Serial No. 483,611. (No model.)

*To all whom it may concern:*

Be it known that I, ELMER A. SPERRY, a citizen of the United States, residing at Cleveland, county of Cuyahoga, and State of Ohio, have invented a new and useful Improvement in Electrical Controllers, of which the following is a specification.

My invention relates to electric controllers, especially such as may be employed with electric motors, and it consists in a novel arrangement of the moving parts whereby the circuit connections leading from the controller are automatically changed during a normal operation of the controller by the action of its principal moving element. This is shown as being accomplished by several different methods, and is applicable to different purposes. For instance, when the controller is employed to control the circuit connections of any device it may be desirable upon successive operations to change the circuit relations of the device. Thus after breaking the circuit, changes are automatically effected so that when the controller is again placed in circuit relation with the device controlled, it compels it to perform an entirely different function and upon again opening the circuit the original circuit connections may again be automatically restored; or still a third new condition brought about, compelling the device to perform still a third function when the circuit relation through the controller is again closed; or if the primary circuit relations are resumed as above, causing the device to repeat its first operation. This will readily be understood when applied for instance to an electric motor, which, by the operation of the controller may be started, the speed increased or diminished, and the current again shut off. In the act of shutting off the current certain switches are automatically thrown, by means of which when the closed circuit relation is again established by the controller the motor (device) finds itself working upon a closed circuit under conditions which compel it to generate a current from the momentum gained by its former operation, which by being made to overcome resistance tends to oppose its motion, while at the same time its former circuit relations are entirely cut off, which are again automatically resumed and proper circuit relations are established for compelling the machine to develop power as a motor by simply throwing the movable portion of the controller into its "off" position. The movable portion may, however, be stopped. In some instances it may be preferable to have the controller so constructed that its movable portion may have an intermediate position at which it may stop after breaking the circuit, and in which it assumes its "off" position without having as yet been brought into engagement with the automatically operated devices, so that its circuit relations may be preserved by arresting its movable portion at this position, or it may be reversed or altered by simply allowing its movable portion to proceed to the end, or near the end, of its "off" stroke. Certain other functions are shown as being performed by the automatically operated devices in the controller, and various novel features are shown in connection with same, all of which are hereinafter specified and will be more fully pointed out in the claims. These are indicated in the accompanying drawings, in which—

Figure I is a plan and partially diagrammatic view of one form of controller; Fig. I$^a$ a view of a detail. Figs. II and III are alternate forms. Fig. IV is a view showing the circuit relations in Fig. I altered.

Similar letters and numerals of reference indicate like parts throughout.

As a specific application of the controller it is shown in connection with an electric motor. It will, however, readily be understood that it may be used to control the current of any electrical device requiring the features embodied therein.

By reference to the drawings, let $a$ $a'$ $a''$ represent stationary contacts and $b$ $b'$ $b''$ represent the co-operating moving contacts. These contacts may be moved in any suitable manner as by arm A, pivoted at A', Figs. I and IV, or upon a cylinder A'', or upon any of the well known forms of moving element of controllers.

B B' represent the ordinary reversing switch which is sometimes present in controllers co-operating with contact buttons B$^5$ B$^6$, and is operated through bell-crank B'', handle B$^3$ and rod B$^4$. At the right in Figs. I and IV however are shown switch levers $c$ $c'$ $c''$ cooperating with buttons $c^3 c^4 c^5$. The switch in these figures is actuated from a projection of the shifter C provided with two cam slots $d$ $d'$ the walls of which unite at $d''$. The shifter C is pivoted at C'. Upon the moving element of the controller is a finger $e$ pivoted at $e'$ and co-operating with a centralizing spring $e''$. The similar parts in Fig. II are lettered to correspond, the finger $e$ simply being mounted upon a projection of the rotating cylinder A″ rather than upon the swinging arm A. An additional feature is shown in both Figs. II and III constituting an interlocking device and consisting in the arms $f f'$ upon which are provided suitable co-operating projections shown in the drawings, the one upon the arm $f'$ being located just outside the path of the one upon the arm $f$ when the arm $f'$ and its attached parts are in one of its "critical" positions; however, when it is in any of its intermediate positions the projection on the arm $f'$ lies in the path of the projection upon the arm $f$, and prevents the moving part from being further moved without first going back and causing the arm $f$ and its attached part to be fully moved into one of its so called "critical" positions. It will further be observed that the finger $e$ co-operates alternately with the cam slots $d$ $d'$ after the manner of this well known mechanical device.

It will readily be understood that the movement of the shifter C may take place at any point or position of movement of the lever A or other main moving element of the controller. For instance, in Fig. III instead of allowing the shifter C to be moved during the backward stroke of the arm A, it is actuated during the forward stroke. It will readily be understood that the pawl $g$ which co-operates with the pins $i$ to rotate the cam could be of any length and cause its rotation at any point in the forward stroke. Or the cam slots $d$ $d'$ of the shifter C shown in the other figures could be so constructed that the finger $e$ would, after moving it to its full extent, pass by and on, and thus it will readily be seen that at any part of either the backward or forward stroke or position of movement of the moving element of the controller the shifter C may be actuated. Furthermore in reference to Fig. II the position of the moving contacts on cylinder A″ are not indicated and may be at any desired position with reference to the operation of the shifter C, finger $e$ and interlocking devices $f f'$, and thus the shifter C may be operated in any position with reference to the relation of the contacts mounted upon the moving element A″ and the stationary contacts represented by $a^3$. The relation shown in Figs. I and IV, namely, the operation of the auxiliary switches after the main circuits have been broken by the contacts $a$ $b$, is considered the preferred form. The pins $i$ of Fig. III are mounted on the plate $i'$ pivoted at $i''$. Upon the face of the revolving plate $i$ is a revolving cam plate $i^3$ provided with alternate depressions and raised portions indicated at $k$ $k'$. Co-operating with the cam plate $i^3$ are two pins $m$ $m'$ shown in dotted lines and secured to the shifter C. The pawl $g$ is held against a pin $n$ by spring $n'$ being pivoted at $n''$. The position of the pins $m$ $m'$ and contour of the cam plate $i^3$ are such that with each successive one-sixth revolution of the cam or the engagement of the pawl $g$ with each successive pin $i$ the position of the shifter C is alternately thrown up and down, shifting the levers $c$ $c'$ $c''$, as will be observed.

In Figs. I, I$^a$ and IV will be seen at $o$ a current indicator, the mechanism of which is contained in the case $o'$, and the circuits of which in Fig. I are open and in Fig. IV closed. This may be of any construction and is preferably protected from weather by a glass $o''$.

M M indicate blow-out magnets situated upon, and moving with, the arm and immediately in front of the moving contacts $b$ $b'$ $b''$. These may consist in either permanent or electro-magnets, and in the latter case are placed suitably in circuit, preferably with one or more of said contacts $b$ as shown. A resistance or rheostat R is suitably connected with the contacts of the controller as indicated in Figs. I and IV. With reference to the circuit connections of the controller shown in Figs. I and IV, let a trolley be indicated at T, the regular field coils of the motor at F, an auxiliary or teaser coil for the motor at $t$, the armature of the motor at E with the commutator brushes indicated by $r$ $r'$. It will be seen in Fig. I that upon closing the circuit the current flows on wire 1 to contact switch $c$ on contact button $c^4$, and by wire 2 to the contact $b$ by way of blow-out magnets M M; thence by contacts $a$ and resistance R to wire 3 and contact button B$^5$, switch arm B, and wire 4 to commutator brush $r$, armature E, commutator brush $r'$, wire 5, switch arm B′, button B$^6$, stationary contact $a''$, movable contact $b''$, wire 6 to magnets M, wire 7 to button $c^5$, switch lever $c'$, wire 8 to moving contact $b'$; thence stationary contact $a'$, wire 9 to fields; thence wire 10 to ground. It will be noticed in this figure that the circuits of the teaser coil $t$ being connected at one end to button $c^3$ is open-circuited, and that the indicator $o$ being connected at one end to the switch lever $c''$ is open-circuited. Wire 11 connecting the auxiliary contact $a^4$ simply shunts a portion of the field as shown in the dotted arrows.

While it is usual to employ a reversing switch in the controller in connection with the field, it will be observed here as connected with the armature and commutator. The direction of the current is indicated by the arrows upon the wires. The direction of the current through the armature may be reversed by shifting the switch arms so that switch arm B will be in contact with button B$^6$ to the right and switch arm B′ in contact with button B$^5$. I have found this arrangement advantageous, especially when I desire to use this machine alternately as a motor and a generator, inasmuch as the field coils and auxiliary or teaser coil $t$ do not have to be reversed, thus greatly simplifying the circuit connections of the same. When, however, the circuit is broken and the motion of the arm A is allowed to proceed sufficiently to the right so that the finger $e$ engages the shifter C, the switch arms to the right are reversed, and upon again moving the arm A to the right and closing the various circuits, and granting that the motor operates from the momentum gained by the current previously applied, the current flows as follows: from the trolley T, wire 1, switch arm $c$ to contact button $c^3$, wire 12, teaser coil $t$, wire 13, stationary contact $a''$, movable contact $b''$, wire 6, magnet M, wire 7, contact button $c^5$, switch arm $c''$, wire 14, indicator $o'$, wire 15 joining wire 10, in the direction of the arrows in dotted lines, inasmuch as the teaser coil is of very high resistance and the current taken from the trolley in this circuit is a comparatively feeble one. It will be noticed however that this current flows through the teaser coil from top to bottom, and in the same direction as the heavy arrows would indicate the current as flowing in the main field coil F, and same direction as it flowed through this coil when the machine was operating as a motor and as shown in Fig. I. The motor being now so coupled that it will produce a current upon closure of the circuit, this current will be found to flow as follows: Starting with the point for instance where this current emanates from the brush $r$, it will be seen to proceed by wire 4, switch arm B, contact button $B^5$, wire 3 to rheostat R, contacts $a$ to contact $b$, through magnets M M by wire 2 to contact $c^4$, switch arm $c''$, wire 8, to contact $b'$, stationary contact $a'$, wire 9 to field coil F, wire 15 to indicators $o\ o'$, wire 14 to switch arm $c''$, button $c^5$, wire 7, magnets M, wire 6 to movable contacts $b''$, stationary contact $a''$, button $B^6$, switch arm $B'$, wire 5, commutator brush $r'$, armature E, back to the starting point, namely commutator brush $r$. The circuit will thus be seen to include the rheostat R, or as much of it as is not cut out by the position of the contact $b$. If same however is in its extreme position to the left, all the resistance would be cut out, and the motor would be working as a generator upon a practically short circuit. It will furthermore be observed while the current through the fields has remained in the same direction, the current through the armature has changed as will be noticed by comparison with the direction of the arrows in Figs. I and IV. The teaser circuit in Fig. IV from the trolley to the ground is made to traverse one of the stationary and movable contacts $a''$ and $b''$ for the purpose of rupturing it prior to the movement of the switch $c$. In part of the wires involving this teaser circuit we have the phenomenon of two currents going in opposite direction on the same wire, which is not at all incompatible and is often met with in some forms of duplex telegraphy. The circuit connections are omitted from the three switches $c$ in Figs. II and III for the sake of simplicity, but will readily be understood by reference to Figs. I and IV. It might be said that the current indicator $o$ indicates the differential effects of the two currents present in its circuit. The teaser current however being so minute it practically represents the intensity of the main current generated in the local circuit.

The application of the controller has been referred to, and its operation will need no further explanation than that which has already been entered upon. The presence of the current indicator is rendered important from the fact that when the machine is used as a generator, and especially where it is connected to a mass in which has been developed a great momentum it is possible by the simple act of removal of the resistance R to produce so abnormally great a current as to over charge or over heat the various conductors of the system. The indicator as embodied, as a part of the controller, may be of any convenient style or action and indicates the approach to the said abnormally great current, and by giving an alarm or other indication will signal the operator to discontinue the further cutting out of resistance from the circuit and arrest thereby the increment of current before the same has reached a dangerous point. A rotating moving part may be substituted for the swinging arm A as shown in Fig. II at $A''$, and many other alterations and modifications may be made in the apparatus without departing from the principle of my invention, and while it is designed to use all of the above features in connection with one another, yet it is obvious that some may be used without the others, and the invention extends to such use.

The term "critical positions" is used to indicate certain predetermined positions of rest of the moving element or elements referred to, being those particular positions in which the operated devices such, for instance, as the switch-arms $c$, $c'$ and $c''$ are in proper position upon their contacts. Limited as by the drawings the phrase "extreme positions" might be used, but it will readily be understood that there might be three positions in number instead of two, rendering the word "critical" more desirable. The term "intermediate positions" simply refers to the positions as intermediate or between the said critical positions.

The contacts which are fixed upon the moving elements of the controller and co-operating with the stationary contacts will be readily understood to have three regions of movement which may be designated and defined as follows: first, "closed circuit" indicating that the circuit is closed by the contacts being in electrical connection. Now the open circuit relation is sub-divided into two other regions, which may be indicated as "remote open circuit" after the moving element has broken circuit and moved to its extreme "off" position, and the other intermediate position between the closed circuit and remote open circuit is indicated as the "intermediate open circuit" region being the position immediately after the circuit is opened and in which the arcing takes place, and in which position the arm should not be allowed to remain but the arm should be quickly moved through this region into the third or "remote open circuit" position above referred to.

Having described my invention, what I claim as new, and desire to secure by Letters Patent, is—

1. In an electrical controlling mechanism, sets of cooperating contacts or electrodes, a part which is moved in the normal operation of the controller having a limit to its motion connected with or bearing one or more sets of said contacts, circuit controlling contacts having two closed circuit positions, said contacts connected with such controller, in combination with means whereby the said positions of said circuit controlling contacts are reversed by said moving part immediately within one of its limits during the said normal operation of the said controller.

2. In an electrical controlling mechanism, sets of cooperating contacts or electrodes, a part which is moved in the normal operation of the controller having a limit to its motion, connected with or bearing one or more sets of said contacts, circuit controlling contacts having two closed circuit positions, said contacts connected with such controller, in combination with means whereby the said positions of said circuit controlling contacts are reversed by said moving part immediately within one of its limits, and means whereby said reversed position of the circuit controlling contacts obtains during the next succeeding normal operation of said controller.

3. In an electrical controlling mechanism, sets of cooperating contacts or electrodes, a moving part having a limit to its motion connected with or bearing one or more sets of said contacts, a switch, additional moving mechanism having successive re-occurring phases of position or different positions of rest, connected with the said switch, different circuits controlled by the said switch, in combination with mechanism whereby the said phases or positions are made to constantly succeed each other, or re-occur in their order, being actuated by said moving part immediately within one of its limits whereby a new circuit relation is established at the said switch by the movement of the said moving part while at or near its said limit and before its next regular operation or motion occurs.

4. In an electrical controlling mechanism, sets of cooperating contacts or electrodes, a moving part having a limit to its motion, connected with or bearing one or more sets of said contacts, circuit controlling contacts which by successive movements establish circuit relations in a constantly reoccurring order, in combination with mechanism for moving said contacts by the said moving part immediately within one of its limits, substantially for the purpose specified.

5. In an electric controller, a moving element, a finger-like actuator for limiting the movement of said element; cooperating with the said finger-like actuator, a switch shifter for the element having a number of independent notches, and mechanism whereby with each succeeding engagement between the actuator and the shifter the finger will operate upon different notches.

6. In an electric controller, a moving element, a finger-like actuator for limiting the movement of said element; cooperating with the said finger-like actuator, a switch shifter for the said element having two notches, and mechanism whereby with each succeeding engagement between the actuator and the shifter the finger will operate upon first one and then the other of the said notches.

7. In an electric controller, a moving element, a finger-like actuator for limiting the movement of said element; cooperating with the said finger-like actuator, a pivoted switch shifter for the element having a pair of notches, one on each side of the said pivot, and mechanism whereby with each succeeding engagement between the actuator and the shifter the finger will operate upon first one and then the other of the said notches.

8. In an electric controller, a main moving element, a finger-like actuator for limiting the movement of said element, in combination with a moving shifter for said actuator having successive re-occurring "critical" positions of rest, and a locking device between the moving elements, the arrangement being such that the elements are free to move at the said "critical" positions, the main moving element being locked at intermediate positions.

9. In an electric controller, a system of electrical connections from the controller to a device controlled thereby, a single set or series of contacts within said controller, a principal moving element for said controller provided with cooperating contacts whereby contact is made and broken with the said series, an auxiliary moving element which engages and is moved by the said main moving element at some predetermined point in its movement, in combination with circuit controlling mechanism operated by said auxiliary moving element, and mechanism connected with such abutment whereby said circuit connections are changed at the time of each engagement between the main moving element and the auxiliary moving element and are held in such changed relation during the normal operation of the main moving element of the controller and while it engages said series of contacts.

10. In an electric controller, a system of electrical connections from the controller to a device controlled thereby, a single set or series of contacts within said controller, a principal moving element for said controller provided with cooperating contacts whereby contact is made and broken with the said series, an auxiliary moving element which engages and is moved by said main moving element at some predetermined point in its movement in one direction only, in combination with circuit controlling mechanism operated by said auxiliary moving element, and mechanism connected with such abutment whereby said circuit connections are changed at the time of each engagement between the main moving element and the auxiliary moving element and are held in such changed relation during the normal operation of the main moving element of the controller and while it engages the said series of contacts.

11. In an electrical controller, two moving elements one actuated by the other at or near the end of its stroke or movement, an electric switch, circuits controlled thereby, means connected with one of the elements whereby the said switch is thrown from one of its circuit connections to another, in combination with an interlocking device between the said moving elements whereby the actuating element is prevented from further movement until the movement of the said other element has been fully accomplished.

12. In an electric controller, two moving elements, one actuated by the other at or near the end of its stroke or movement, the last named moving element having certain critical and intermediate points in its movement, an electric switch, circuit connections for such switch, and mechanism whereby such switch is connected to the said last named moving element in combination with an interlocking device by means of which the moving elements are locked during the said intermediate positions and freed only at the said critical positions of movement of the said moving element, whereby the actuating element is prevented from further movement until the movement of the other element has been fully accomplished.

13. In an electric controller, two moving elements, one actuated by the other at or near the end of its stroke or movement, the first named moving element having certain critical and intermediate points in its movement, an electric switch, circuit connections for such switch, and mechanism whereby such switch is connected to the said last named moving element an interlocking device by means of which the moving elements are locked during the said intermediate positions and freed only at the said critical positions, whereby the actuating element is prevented from further movement until the movement of the other element has been fully accomplished in combination with electrical circuit controlling contacts actuated by each of said moving elements.

14. In an electric controller, a main moving element for the controller which is moved to and fro in the normal operation of the controller, a circuit interrupter actuated in successive or intermittent impulses from said moving element, in combination with connecting mechanism whereby the circuit of the interrupter is closed by the first said to and fro movement and is then opened by the next to and fro movement.

15. In an electric controller, a main moving element and a series of contacts operated thereby, an electric machine controlled thereby, having a main circuit, a supply circuit for the system, means connected with the controller for disconnecting the supply circuit from the said main circuit and closing said main circuit upon a local circuit, and a current regulator within said local circuit actuated by the said main moving element.

16. In an electric controller, a reversing switch, an oscillating moving element which actuates such reversing switch by successive or intermittent impulses at one end of its normal stroke, in combination with connecting mechanism by means of which the circuit of the reversing switch is alternately reversed and re-established by each successive actuation, substantially for the purpose specified.

17. In an electric controller, a system of electrical connections from the controller to a device controlled thereby, a single set or series of contacts within said controller, a principal moving element for said controller with cooperating contacts whereby contact is made and broken with the said series, in combination with means whereby the circuit relations between the controller and the device may be changed by the movement of the said element after breaking and before re-establishing contact between the series of contacts and the cooperating contact of said controller.

18. In an electric controller, a system of electrical connections from the controller to a device controlled thereby, a single set or series of contacts within said controller, a principal moving element for said controller with cooperating contacts whereby contact is made and broken with the said series, in combination with means whereby the circuit relations between the controller and the device may be reversed by the movement of the said element after breaking and before re-establishing contact between the series of contacts and the cooperating contact of said controller.

19. In an electric controller, a system of circuit connections from said controller to two or more devices controlled thereby, a single set or series of contacts within said controller, a principal moving element for said controller with cooperating contacts whereby contact is made and broken with the said series, in combination with means whereby the circuit relations between the controller and the two or more devices may be changed by the movement of the said element after breaking and before re-establishing contact between the series of contacts and the cooperating contact of the controller.

20. In an electric controller, a system of electrical connections from the controller to a device controlled thereby, a single set or series of contacts within said controller, a principal moving element for said controller with coöperating contacts whereby contact is made and broken with the said series, an additional device or devices and circuits therefrom to the controller means whereby the circuits of the additional devices are broken by movement of the said element after breaking and before re-establishing contact between the series of contacts and the cooperating contact of said controller.

21. In an electric controller, a system of electrical connections from the controller to an electric machine controlled thereby, a single set or series of contacts within said controller, a principal moving element for such controller provided with cooperating contacts whereby contact is made and broken with the said series, a supply circuit for said system, in combination with means whereby the supply circuit is opened by the movement of the said element after breaking and before re-establishing contact between the series of contacts and the cooperating contact of said controller.

22. In an electric controller, a system of electrical connections from the controller to an electric machine controlled thereby having two circuits, a single set or series of contacts within said controller, a principal moving element for said controller provided with cooperating contacts whereby contact is made and broken with the said series, a supply circuit for said system, in combination with means whereby the supply circuit is transferred from one to the other of said circuits by the movement of the said element after breaking and before re-establishing contact between the series of contacts and the cooperating contact of said controller.

23. In an electric controller, a system of electrical connections from the controller to an electric machine controlled thereby having a main and an auxiliary circuit, a single set or series of contacts within said controller, a principal moving element for such controller provided with cooperating contacts whereby contact is made and broken with the said series, a supply circuit for said system, in combination with means whereby the supply circuit is transferred from the main to the auxiliary circuit and the main circuit closed as an independent circuit by the movement of the said element after breaking and before re-establishing contact between the series of contacts and the cooperating contact of said controller.

24. An electrical controller, a system of electrical connections from the controller to an electric machine controlled thereby having a main and an auxiliary circuit, a moving element of such controller, contacts made and broken thereby, a supply circuit for said system, in combination with means whereby the supply circuit is transferred from the main to the auxiliary circuit and the main is closed as an independent circuit by the movement of the said element after breaking and before reestablishing a principal closed circuit relation of the circuit.

25. An electrical controller, a system of electrical connections from the controller to an electric machine controlled thereby, a principal moving element of such controller, contacts made and broken thereby, a supply circuit for said system, in combination with means whereby the supply circuit is opened and the connections between the controller and the machine are altered by the movement of the said element after breaking and before reestablishing a principal closed circuit relation of the said altered connections.

26. In an electrical controller, a system of electrical connections from the controller to an electric machine controlled thereby, an additional device such for instance as coil $t$ with circuits running to the controller, contacts made and broken thereby, a supply circuit for said system, in combination with means whereby the supply circuit is opened, the connection between the controller and the machine is altered, and the main circuit and those of the additional device are connected, all by the movement of the said element after breaking and before reestablishing a principal closed circuit relation of the system.

27. In an electrical controller having a main moving element, a current indicator forming a part thereof, a circuit therefor, a switch in said circuit adapted to be thrown during the normal movement or operation of said moving part.

28. An electrical controller, a system of electrical connections leading from said controller, a principal moving element for the controller, main contacts made and broken thereby, auxiliary contacts for one or more of the circuits controlled in series circuit relations with said main contacts, and means whereby said auxiliary contacts are shifted from one circuit relation to another by the movement of said element after breaking and before re-establishing a principal closed circuit relation of the system.

29. An electrical controller, a system of electrical connections leading from said controller, a principal moving element for the controller, main contacts made and broken thereby, auxiliary contacts for one or more of the circuits controlled, in series circuit relation with said main contacts, means whereby said auxiliary contacts are shifted from one circuit relation to another by the movement of said element after breaking and before re-establishing a principal closed circuit relation of the system, whereby the auxiliary contacts are always open-circuited while moving.

30. In an electrical controller, main contacts which are made and broken by the main moving element of the controller, a multi-contact switch within such controller the contacts of which are in series circuit relation with separate main contacts of the controller in such a manner that its circuits may be entirely open-circuited thereby.

31. In an electrical controller, a contact breaker having three regions or zones of movement which may be indicated respectively as "closed circuit," "intermediate open circuit" and "remote open circuit," a mechanism connected with such controller, in combination with mechanical connections whereby the said mechanism is actuated by the said contact breaker while moving in the said "remote open circuit" region or zone, substantially for the purpose specified.

32. In a controller for an electrical machine having main field coils, and an auxiliary field coil for the same, the circuits of which are manipulated by the said controller a main moving element for said controller and an auxiliary moving element automatically moved from the said main moving element, a reversing switch for the machine connected with the armature thereof automatically actuated by the auxiliary moving element, substantially for the purpose specified.

33. In a controller for an electrical machine having main field coils and an auxiliary field coil for the same, the circuits of which are manipulated by the said controller, a main moving element for said controller and an auxiliary moving element automatically moved from the said main moving element, a reversing switch for the machine connected with the armature thereof, and an auxiliary contact within such controller for breaking the circuit of said auxiliary field coil automatically actuated by the auxiliary moving element.

34. In a controller for an electrical machine having main field coils and an auxiliary field coil for the same, the circuits of which are manipulated by the said controller, a main moving element for said controller and an auxiliary moving element automatically moved from the said main moving element, a reversing switch for the machine connected with the armature thereof, a supply circuit for the system, circuit controlling contacts within the controller, and means whereby the supply circuit is changed from one of the field coils to the other, the said means automatically actuated by the auxiliary moving element.

35. In an electrical controller, a main moving element and a series of contacts operated thereby, an electric machine controlled thereby having a main circuit, a supply circuit for the system, means connected to the controller for disconnecting the supply current from the said main circuit and closing said main circuit upon a local circuit, a current regulator within said local circuit actuated by the said main moving element, and a current-intensity indicating device in said local circuit for aiding in the operation of the said regulator.

ELMER A. SPERRY.

Witnesses:
C. A. BOYD,
L. U. HUGHES.